US009690885B2

(12) United States Patent
Walsh et al.

(10) Patent No.: US 9,690,885 B2
(45) Date of Patent: Jun. 27, 2017

(54) INTERACTIVE VISUALIZATION OF RESERVOIR SIMULATION DATA SETS (71) Applicant: SCHLUMBERGER TECHNOLOGY CORPORATION, Sugar Land, TX (US)

(72) Inventors: Dominic Walsh, Oxford (GB); Milan Frank, Faringdon (GB); Richard Asbury, Abingdon (GB); Mark Wakefield, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 584 days.

(21) Appl. No.: 14/459,108

(22) Filed: Aug. 13, 2014

(65) Prior Publication Data
US 2015/0051891 A1 Feb. 19, 2015

Related U.S. Application Data (60) Provisional application No. 61/866,854, filed on Aug. 16, 2013.

(51) Int. Cl.
*G06G 7/48* (2006.01)
*G06F 17/50* (2006.01)

(52) U.S. Cl.
CPC ...... *G06F 17/5009* (2013.01); *G06F 2217/16* (2013.01)

(58) Field of Classification Search
CPC .......................... E21B 49/00; G06F 17/5009
USPC ..................................................... 703/6, 10
See application file for complete search history.

(56) References Cited

U.S. PATENT DOCUMENTS

| 6,208,997 | B1 | 3/2001 | Sigeti et al. | |
| 7,451,066 | B2 | 11/2008 | Edwards et al. | |
| 7,516,055 | B2* | 4/2009 | Strebelle | G01V 1/30 703/10 |
| 7,561,997 | B1 | 7/2009 | Miller | |
| 7,684,967 | B2* | 3/2010 | Wallis | E21B 49/00 345/420 |

(Continued)

FOREIGN PATENT DOCUMENTS

WO 9800811 A1 1/1998

OTHER PUBLICATIONS

Combined Search and Examination Report issued in GB1414560.1 on Feb. 18, 2015, 7 pages.

*Primary Examiner* — Andy Ho
(74) *Attorney, Agent, or Firm* — Colin Wier; Alec McGinn; Mitch Blakely (57) ABSTRACT

A method, system, and computer-readable medium for providing a visualization of a model. The method includes receiving a grid of the model including cells representing space, time, or both in the model. The method also includes grouping at least some of the cells into first-level gridlets. The method also includes grouping at least some of the first-level gridlets into second-level gridlets. The method further includes determining a first upper limit of elements to send for display, based on a display system capability, and determining that the number of first-level gridlets exceeds the first upper limit, and that the number of second-level gridlets is less than or equal to the first upper limit. In response, the method includes selecting at least some of the second-level gridlets for display and omitting from display at least some of the cells and at least some of the first-level gridlets.

20 Claims, 7 Drawing Sheets

(56) References Cited

U.S. PATENT DOCUMENTS

| | | |
|---|---|---|
| 7,904,248 B2 | 3/2011 | Li et al. |
| 8,301,429 B2 | 10/2012 | Hajibeygi et al. |
| 8,558,834 B2 | 10/2013 | Lee |
| 8,725,481 B2 | 5/2014 | Usadi et al. |
| 2008/0238919 A1 | 10/2008 | Pack et al. |
| 2011/0313745 A1* | 12/2011 | Mezghani ............ G01V 99/00 703/10 |
| 2013/0211800 A1* | 8/2013 | Fung ................ G06F 17/5009 703/2 |
| 2013/0223187 A1 | 8/2013 | Tharpar et al. |
| 2014/0152664 A1 | 6/2014 | Le et al. |
| 2014/0236559 A1* | 8/2014 | Fung .................... E21B 41/00 703/10 |

* cited by examiner

INTERACTIVE VISUALIZATION OF RESERVOIR SIMULATION DATA SETS

CROSS-REFERENCE TO RELATED APPLICATION

This application claims priority to U.S. Provisional Patent Application Ser. No. 61/866,854, which was filed on Aug. 16, 2013. The entirety of this provisional application is incorporated herein by reference.

BACKGROUND

Reservoir simulators that can run in parallel on high performance computing clusters are capable of processing models with hundreds of millions and even billions of grid cells. These models are expected to continue to grow as the fidelity of the data available to the engineers continues to improve, and as the availability of computing power continues to expand.

In contrast, visualization of these models is often carried out on workstations that, in comparison to the simulation clusters, have relatively limited resources. A challenge is realized in delivering an interactive experience to the user with visualizations executed on such workstations. While some approaches, such as loading the full model or results into memory have been successfully implemented in small and moderately-sized simulation models, such solutions generally are not scalable to large models of, e.g., billions of cells.

SUMMARY

Embodiments of the disclosure may provide methods, systems, and non-transitory computer-readable media for providing a visualization of a model. For example, one embodiment of the method disclosed herein includes receiving a grid of the model, the grid including, a plurality of cells representing space, time, or both in the model. The method also includes grouping at least some of the plurality of cells into first-level gridlets, with a number of cells in the model being greater than a number of first-level gridlets in the model. The method further includes grouping at least some of the first-level gridlets into second-level gridlets, with the number of first-level gridlets being greater than a number of second-level gridlets in the model. The method also includes determining a first upper limit of elements to send for display, based on a display system capability. The method additionally includes determining that the number of first-level gridlets exceeds the first upper limit, and that the number of second-level gridlets is less than or equal to the first upper limit, and, in response, selecting at least some of the second-level gridlets for display and omitting from display at least some of the plurality of cells and at least some of the first-level gridlets.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 5-1, 5-2, and 5-3 illustrate simplified, conceptual views of a grouping process in an unstructured grid, according to an embodiment.

DETAILED DESCRIPTION

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing, from the spirit and scope of the present disclosure.

Grid coarsening is a process by which cells of a grid defined in a model are combined. Coarsening has the effect of reducing the effective number of discrete elements (cells) in the model, or a portion thereof, thereby reducing the number of calculations that may be performed when advancing through a time-step in a simulation, altering a model in response to user interaction, or performing other modeling operations. In the present disclosure, methods are provided that apply this concept to visualizations of models, thereby supporting remote visualization of highly-complex models by relatively low-power (e.g., remote) workstations. In general, a hierarchy of gridlets may be formed with varying levels of detail that may span from a single gridlet that describes an entirety of a model (or a region thereof), to gridlets that each include a single grid cell. The method may include determining a level of detail appropriate to send to a system displaying the model, based on the system capabilities and the usage of the system e.g., idle, interactive, etc.). The method may then filter the gridlets based on one or more of a variety of factors and provide the gridlets with the level of detail to the display system.

Figure 1:
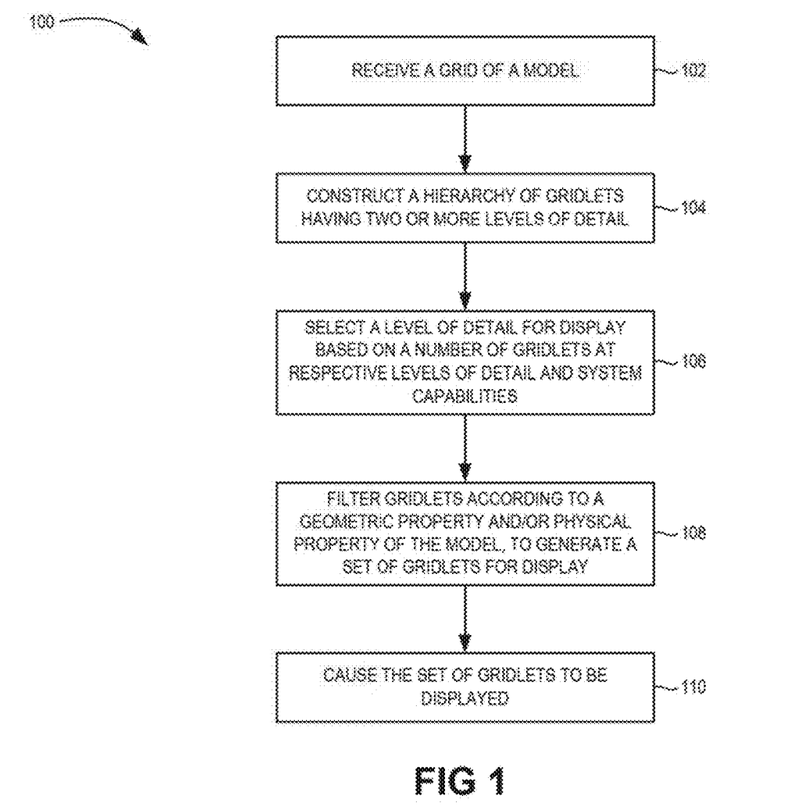
FIG. 1 illustrates a method for visualizing a model, according to an embodiment.

Turning now to the specific, illustrated embodiments, FIG. 1 illustrates a method 100 for providing a visualization of a model, according to an embodiment. The model may be, for example, a digital representation of a subterranean volume or domain and may include one or more geological features or subterranean domain objects (e.g., wells, reservoirs, etc.) in an oilfield context. In other embodiments, the method 100 may be employed in other contexts, with other types of models.

The method 100 may thus include receiving a grid of a model, as at 102. The grid may include discrete elements (cells), for example, millions or billions of cells. The cells may represent space, time, or both in the grid of the model. The cells may be associated with data, e.g., in a table or another database structure. The data may be sufficient to allow for filtering of the cells based on geometry and/or property values. Further, bounding boxes may be defined around groups of cells, which may, for example, define contours of features of interest (e.g., wells, faults, etc.) in the model. Accordingly, while the cells may define details of a complex shape, the bounding box may define a simpler shape, in which the cells of the complex shape are contained. Moreover, the grid may be uniform, non-uniform, homogeneous, regular, irregular, etc. Any type of grid may be employed consistent with the present disclosure.

Figure 2:
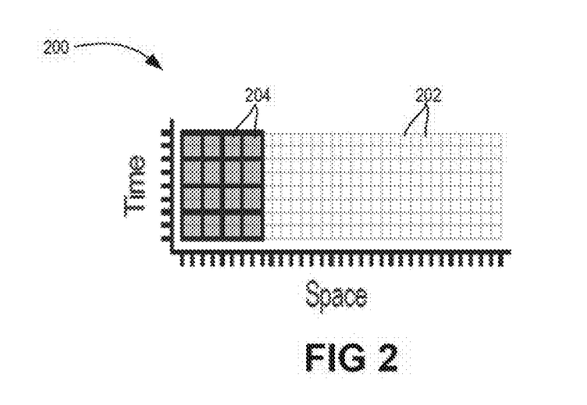
FIG. 2 illustrates a greatly simplified, conceptual view of a portion of a grid of a model, according to an embodiment.

FIG. 2 illustrates a greatly simplified, conceptual view of a portion of a grid 200 of a model. The grid 200 may be four dimensional, e.g., a three-dimensional object that changes with time. The illustrated grid 200 has time on the vertical axis and space on the horizontal axis. The grid 200 may include cells 202, which may be the smallest unit of the grid 200. The cells 202, as shown, may be grouped together to form gridlets 204, as will be described in greater detail below. Accordingly, the cells 202 may be adjacent or separated apart in terms of time and/or space, consistent with some embodiments of the present disclosure, particularly in a dynamic model. In other embodiments, such as in static models, the grid 200 may be confined to three-dimensions. Again, it is emphasized that, although a uniform grid 200 with square-shaped cells 202 is illustrated, any type of grid may be employed.

Figure 3:
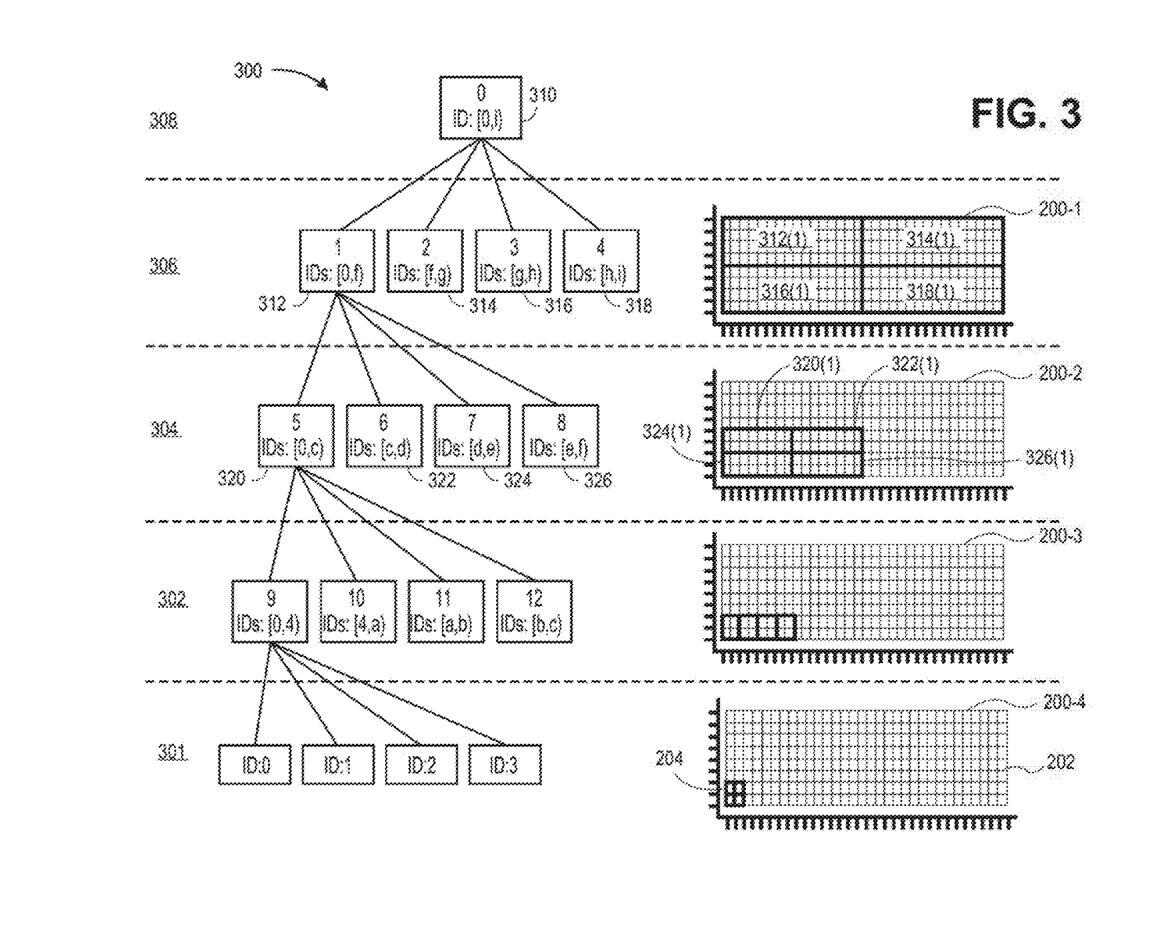
FIG. 3 illustrates an example of a simplified hierarchy of gridlets, according to an embodiment.

Referring again to FIG. 1, the method 100 may proceed to constructing, a hierarchy 300 of gridlets 204, with the hierarchy 300 having two or more "levels of detail" or "LOD"), as at 104. FIG. 3 illustrates an example of a hierarchy 300 (e.g., a tree) of gridlets, according to an embodiment in this simple example, the hierarchy 300 includes five levels of detail, LOD0 301, LOD1 302, LOD2 304, LOD3, 306, and LOD4 308. Further, each of the nodes are associated with a gridlet of the grid 200. More particularly, the nodes may include indices or pointers to the gridlets with which they are associated, e.g., as part of a results file. The results file may also store data such as the minimum and maximum values of the cells or gridlets contained within the gridlet with which each node is associated. Accordingly, the data associated with the gridlets may be located and read without searching for the gridlets, once a node is selected.

FIG. 3 also shows a mapping of the LODs 301-308 to the grid 200 (e.g., shown as grids 200-1, 200-2, 200-3, and 200-4). The top of the hierarchy, LOD4 308, may contain a single node 310, representing all (or a certain subset) of the cells 202 of the grid 200. This "root" node 310 may contain n child nodes in the LOD3 306. In the specific, illustrated example, the root node 310 contains four child nodes 312, 314, 316, 318 in the LOD3 306 (e.g. n=4). As shown in grid 200-1, the grid 200-1 is likewise divided into four gridlets 312(1), 314(1), 316(1), 318(1) which are associated with the nodes 312, 314, 316, and 318.

In the LOD2 304, the hierarchy 300 may include four nodes for every LOD3 node 312-318. For example, the node 312 may be associated with four LOD2 nodes 320, 322, 324, 326. Further, the gridlet 312(1) associated with the node 312 may also include four LOD2 gridlets 320(1), 322(1), 324(1), 326(1). The nodes 314-318 and associated gridlets 314(1)-316(1) may be similarly partitioned. This pattern may continue as the LOD level increases, with the grid 200 moving toward smaller-sized gridlets (e.g., grids 200-3 and 200-4), until, in an embodiment, the gridlets are equal in size to one of the cells 202, e.g., as shown in the grid 200-4 associated with LOD0 301. That is, in the illustrated example, in LOD0 301, each gridlet 204 is defined by a single cell 202.

Although each node/gridlet is illustrated as including four of the immediately lower-level nodes/gridlets, it will be appreciated that any number of the nodes/gridlets may be grouped together to form higher-level nodes/gridlets. Further, the grouping may be unequal, with some nodes/gridlets containing a first number of smaller gridlets, and others containing one or more other numbers of smaller gridlets. Additional details regarding one or more embodiments of grouping the gridlets are provided herein below.

Referring back again to FIG. 1, the method 100 may proceed to selecting a level of detail for display based on a number of gridlets at respective levels of detail and display system capabilities, as at 106. As can be appreciated from FIG. 3, the number of gridlets defining a given area increases with decreasing. LOD number in the hierarchy 300; for example, a single LOD3 gridlet 312(1) represents the same area as four $LOD_2$ gridlets 320(1)-326(1). Moreover, when considering second and third spatial dimensions (in addition to the single spatial dimension and time dimension illustrated), this number may increase exponentially.

However, processing power of for example, remote workstations may be small relative to the processing power of the system that maintains the model. Thus, the method 100 may select a maximum number of gridlets to display, e.g., in order to tailor the visualization to the visualization system capabilities and current usage (e.g., interactive, idle, etc.), as will be described in greater detail below. Accordingly, the method 100 may include balancing the detail illustrated in the visualization of the model with the speed at which the visualization may be displayed and, in some embodiments, manipulated.

The method 100 may also include filtering the gridlets, e.g., at the selected level of detail, according to a geometric property and/or a physical property of the model, to generate a set of gridlets for display, as at 108. For example, certain visualizations of models may proceed by displaying areas of the model, while not displaying other areas (e.g., focusing on one region or time, e.g., a "scene"). Thus, gridlets in areas outside the viewing area may be filtered (e.g., not sent for display). Further, certain visualizations may also display gridlets with a certain specified physical characteristic, such as porosity, of the volume/time in the region of the model that the gridlet represents. Gridlets representing regions that do not have the specified physical characteristic may also be excluded from display. It will be appreciated that gridlets may be excluded from display for a variety of other reasons, with those described herein being a few examples among, many contemplated.

Furthermore, the hierarchy 300 (FIG. 3) may facilitate quick access to data stored in association with the gridlets, e.g., for such filtering. As noted above, the nodes may point to gridlets in a results file, and the results file may include geometry and the property values associated with the region/time of the model represented by the gridlet. To access the geometry and/or property values, the system may load geometry or property data from the results file, for a gridlet at a selected level of detail.

The method 100 may then include causing the filtered gridlets to be displayed, as at 110, e.g., on a monitor, screen, or other display device. The display device may be proximal to or remote from the processors that, in an embodiment, conduct one or more of the actions at blocks 102-110. For example, the display may be provided as part of a web browser, portal, or another application, which may be executed on a remote machine.

Figure 4:
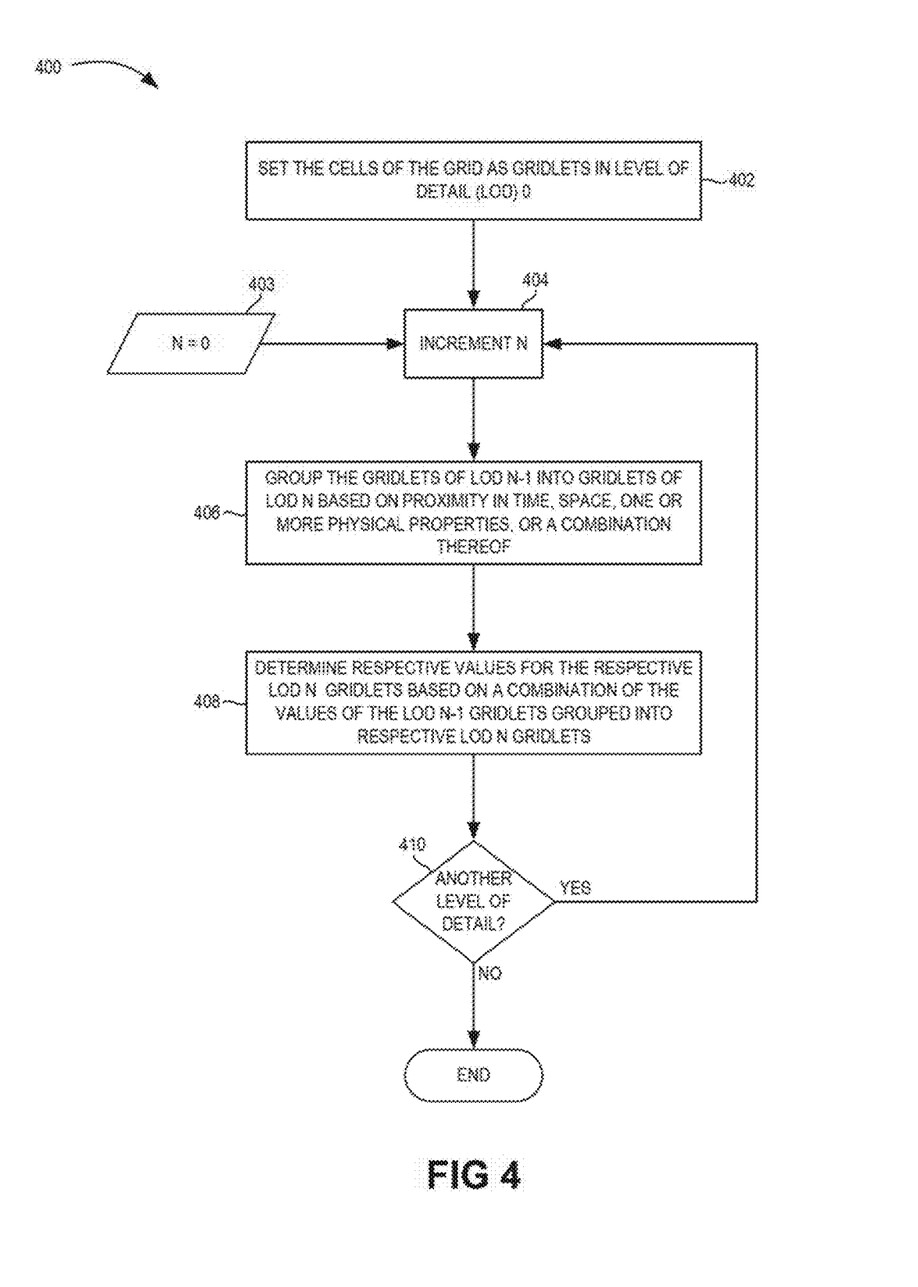
FIG. 4 illustrates a flowchart of a process for grouping the gridlets and constructing the hierarchy of gridlets, which may be implemented as part of the method of FIG. 1, according to an embodiment.

FIG. 4 illustrates a flowchart of an example of a process 400 for grouping the cells and constructing the hierarchy 300 of gridlets, as at 104 of FIG. 1, according to an embodiment. The process 400 may begin by setting the cells, which may the smallest, uncoarsened elements of the grid, as gridlet of a level of detail 0 (e.g., LOD0 301 in FIG. 3), as at 402. The process 400 may then increment a variable N (corresponding to a current LOD), as at 404, which may have been initialized to zero as at 403. The process 400 may then group the gridlets of LOD N−1 into gridlets of LOD N, based on time, space, one or more physical properties, or a combination thereof, as at 406.

With the gridlets grouped into LOD N, one or more values may be associated with the gridlets, e.g., representing physical characteristics of the domain represented by the model at the location of the gridlet. Accordingly, in an embodiment, the process 400 may include determining respective values for the respective LOD N gridlets based on a combination of the values of the LOD N−1 gridlets grouped into the respective LOD N gridlets, as at 408. In other words, in an example, the value(s) associated with each LOD N gridlet may be determined from the LOD N−1 gridlets that are grouped together to form the LOD N gridlet. In an example, the value may be a simple average of the LOD N−4-1 gridlets' values. In another example, other statistical measures may be employed to arrive at the value for the LOD N gridlets. In some embodiments, multiple values may be employed in association with the gridlets, such as a minimum and maximum of the smaller gridlets grouped therein.

In an embodiment, the grouping may be configured to avoid a preferential dimension. For example, an operator may be employed to group cells together that are spatially and/or temporally proximal to one another. The operator may be similar in concept to a moving window that proceeds through the grid, so as to group the cells/gridlets contained in the window into a higher LOD gridlet. The operator may be symmetric, in an embodiment, but in others may be any suitable shape.

In an embodiment, the grouping may be conducted on a report-step by report-step basis, e.g., in a purely spatial context. For example, the model may be simulated or otherwise constructed and provided for rendering and visualization once per report-step. In at least some embodiments, the hierarchy of gridlets may be newly established at each report-step. In such an embodiment, the cells and gridlets may be grouped based on spatial considerations, such as proximity, physical consistency, etc. Such an embodiment may allow for sequential writing of restart data by a simulator; however, the groupings may be relatively large in space, since they span one report-step. Thus, referring to FIG. 2, cells 202 (and/or gridlets 204) may be grouped within a single row (let-to-right, as shown) in the spatial domain.

In another embodiment, the grouping may be "transposed." in this embodiment, data for a number of report-steps is transposed so that a single read imports data for multiple steps. This may reduce a spatial size of the gridlets enabling partial loading to be more efficient. This may also include interleaved writing of restart data.

In yet another embodiment, the grouping may be provided according to a combination of space and time. This may reduce the spatial size of the coarser gridlets as compared to the next less-coarse gridlets. This may also allow for key-framing. In addition, averaging property values in time, so as to arrive at a value for the gridlets, may include re-reading results from the previous report-step and incrementing the data.

In still another embodiment, the grouping may be driven by minimizing the variance of a property within a domain. This may improve the accuracy of the coarsened values associated with the gridlets. This may also, however, generate a different tree for each property.

In at least some embodiments, the grouping or coarsening of the gridlets may preserve coarse geological structures, such as faults. A graph partitioning algorithm may be employed to generate the gridlets, along with a variable weighting for the graph vertices based at least partially on the vertical displacement between cells.

Figure 51:
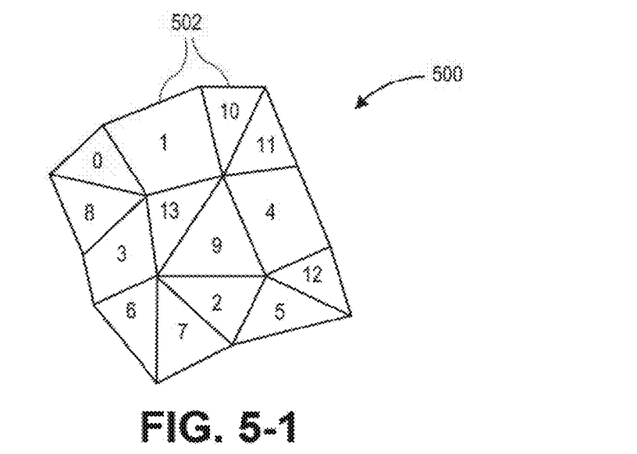
Figure 52:
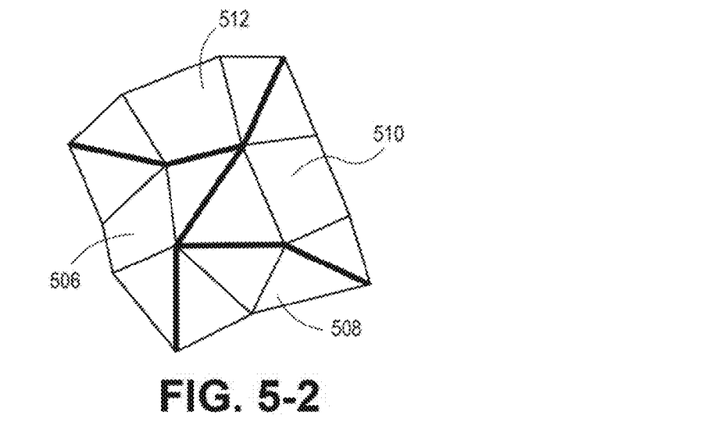
Figure 53:
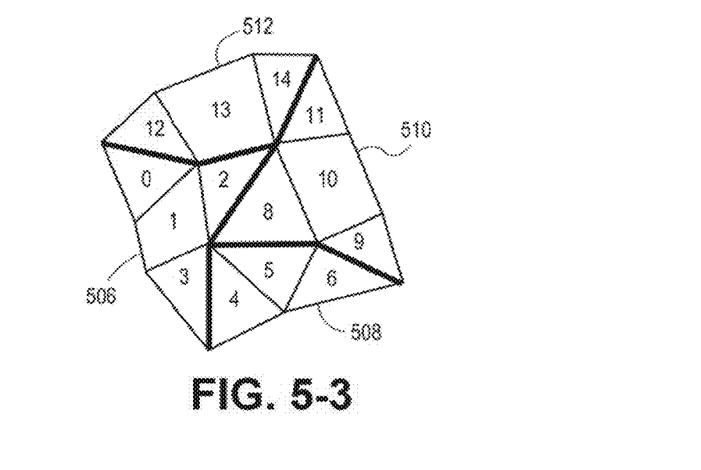

Referring now to FIGS. 5-1, 5-2, and 5-3, there is illustrated a simple example of an application of the grouping process to an unstructured grid 500, according to an embodiment. As shown in FIG. 5-1, the grid 500 may include several cells 502, which are associated with identification numbers (1-12, as shown). The cells 502 may be grouped into gridlets according to a grouping factor, which, in this case, may be four. As a result, in FIG. 5-2, four gridlets 506, 508, 510, and 512 are formed.

As shown in FIG. 5-3, the cells 502 may be ordered (renumbered) contiguously within respective gridlets 504-510. However, there may be less than four cells 502 in each of the gridlets 504-510. Where this occurs, the additional cell may be "padded out," e.g., added as a cell with a zero or null area and/or value. In this case, cells 7 and 16 are padded out, so as to yield four gridlets 504-510 of four cells each (with two cells being null).

Figure 6:
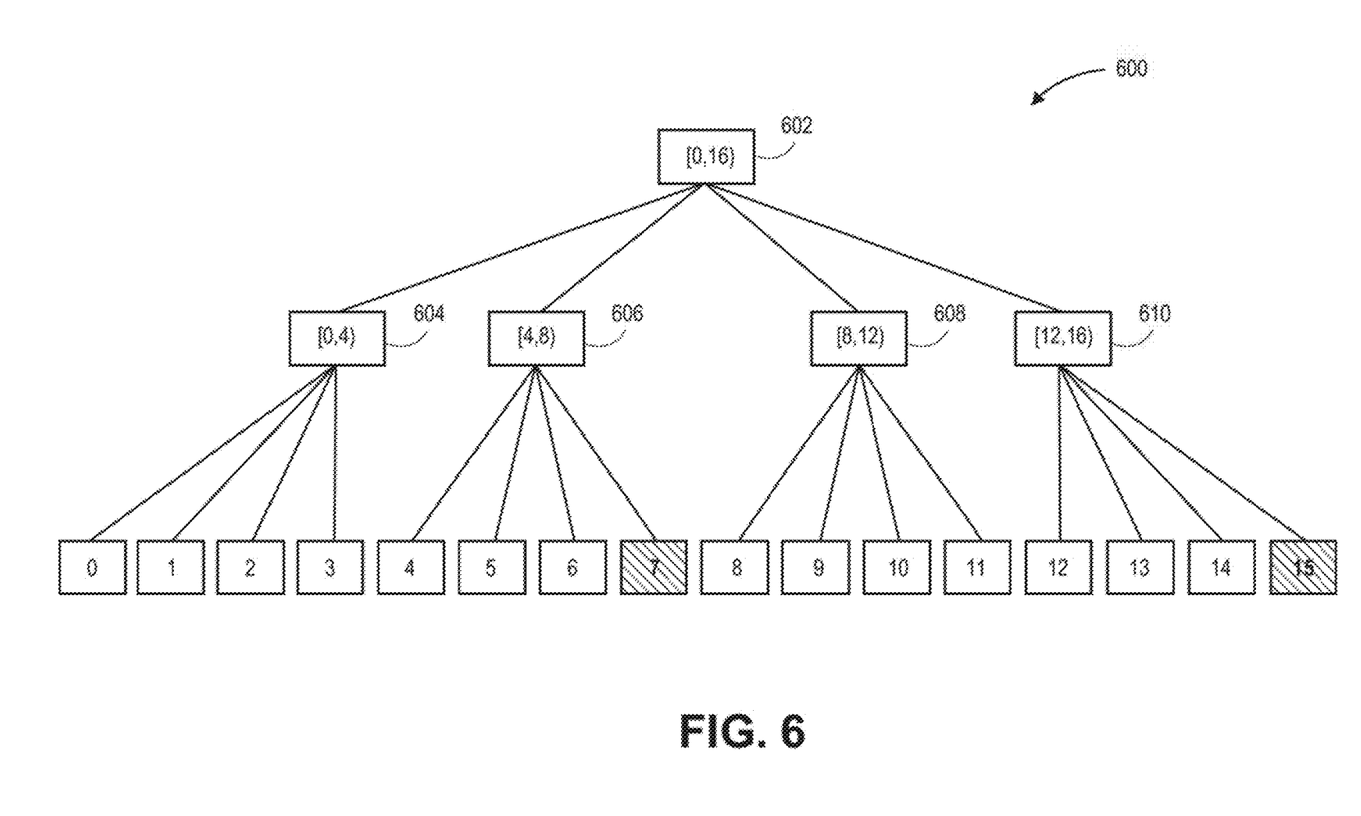
FIG. 6 illustrates a conceptual view of a gridlet hierarchy for the grid shown in FIGS. 5-3, according to an embodiment.

FIG. 6 illustrates a gridlet hierarchy 600 for the grid 500 shown in FIGS. 5-3. As described above with respect to FIG. 3, the hierarchy 600 may include a root node 602 at a highest level, with the root node 602 being associated with all of the cells of the grid 500. In this case, the root node 602 is at LOD2. The root node 602 may include four child, LOD1 nodes 604, 606, 608, and 610, associated with the four gridlets 506, 508, 510, 512, respectively. The four LOD1 nodes 604-610 may include four LOD0 gridlets, which are coextensive with the individual cells 1-16.

The selection of the cells to be padded out may be randomized, or may be selected according to an algorithm. For example, a local optimizing (e.g., Greedy) method may be employed, which may partition the grid such that the padded-out cells are children of as few LOD1 nodes as possible. This may, in turn, reduce the number of non-null LOD1 nodes, which may further enhance search and retrieval times in the hierarchy 600.

Referring again to FIG. 4, the process 400 may then determine whether additional levels of detail are to be considered, as at 410. One way to do this in may be to determine whether the root node (e.g., node 302 in FIG. 3) has been reached. In other embodiments, a predetermined number of levels may be established, which may be less than the number of levels between LOD0 and the root node 302, such that the process 400 may end before reaching the root node 302. If another LOD is to be considered, the process 400 may loop back to decrementing N, as at 404, and complete the subsequent processes again. If not, the process 400 may end.

Figure 7:
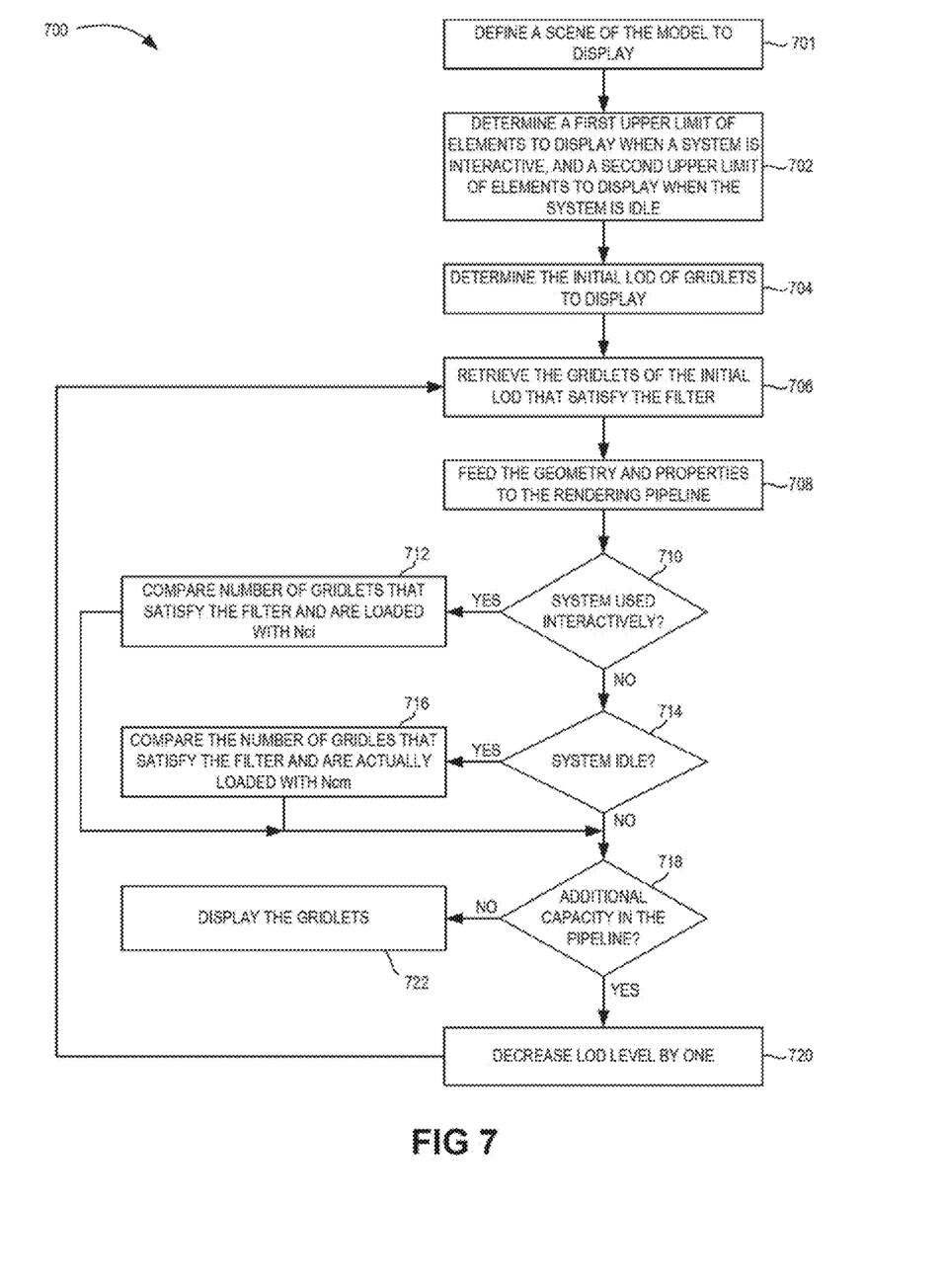
FIG. 7 illustrates a flowchart of an example of a process for filtering and causing gridlets to be displayed on a display device, which may be implemented as part of the method shown in FIG. 1, according to an embodiment.

FIG. 7 illustrates a flowchart of an example of a process 700 for filtering at 108 and causing gridlets to be displayed on a display device at 110 of FIG. 1, according to an embodiment. The illustrated process 700 may apply for a single time step in a visualization in a model. Accordingly, the process 700 may repeat for one, some, or all time steps.

The process 700 may begin by defining a scene of the model to display, as at 701. The scene may be all or a portion of the model, at one or more times. The scene may contain a number of gridlets from each LOD, with the number of gridlets in the scene decreasing as the LOD increases (coarsening). The process 700 may also include determining a first upper limit of elements to display when a system is interactive ($N_{ci}$) and a second upper limit of elements to display when the system is idle ($N_{cm}$), as at 702. For example, when a system is receiving input and, e.g., adjusting a visualization, the system displaying the visualization may have a lower limit on the number of discrete elements of the model it may display. The capacity of the system in terms of the rate of gridlets that can be handled may be predicted, e.g., based at least partially on the system memory, graphical processor unit (GPU) memory, network bandwidth, and characteristics of the file system. Thus, $N_{ci}$ may be less than $N_{cm}$.

Each gridlet includes a number of cells $N_g$. With a given scene, higher-level gridlets (amalgamating a greater number of cells $N_g$) are used to coarsen the model, so that the system is able to keep up, e.g., in "real time," thus rendering at least a portion of the model for display at a resolution that the display system can handle within a tolerable time limit.

The process 700 may also include determining the initial LOD of gridlets to display, as at 704. The initial LOD may be selected such that the number of gridlets to be displayed does not exceed the first upper limit number of gridlets $N_{ci}$. This may be determined, for example, by determining the lowest LOD where the number of gridlets of that LOD falls below the first upper limit. This determination may, for example, be based on the LOD used in a previous system response step (e.g., the previous time the process 700 was conducted), or by comparing the number of gridlets in progressively lower or higher LODs until the appropriate LOD is selected. Further, the grid and property hierarchy structure may be loaded, e.g., as part of the results file, as established at 104 (FIG. 1).

The process 700 may then proceed to retrieving, the gridlets of the selected LOD that satisfy the filter, e.g., geometric and value filters, as at 706. In some embodiments, this may form part of the filtering at 108 of FIG. 1. For example, at the selected LOD, the gridlet data associated with each node may be selected and compared to a filter parameter (geometric or physical value, or both). Those gridlets associated with values that satisfy the filter parameters may be retried, and those that do not, may be excluded.

In some grids, bounding boxes may be defined for gridlets in the hierarchy, e.g., to establish outlines of geometric features of interest in the model. For example, the bounding box may represent a physical extent of a gridlet. Thus, if the bounding box is not in the viewport/viewing frustrum then the gridlet is not either. Performing calculations for the bounding box may be computationally easier, as it may not require the gridlet data to be loaded. In addition, the bounding box may be used to estimate the pixel area of the rendered gridlet and limit the level which is necessary for appropriate visual detail.

Accordingly, for a geometric filter, a bounding box of the gridlets in the hierarchy may be compared with the region of the model that is to be displayed. For a value filter, the comparison may be made on the minimum and maximum values associated with the gridlet. The filtering also includes removing regions that are outside of the region to be displayed (e.g., "off-scene") or otherwise not to be rendered. The structure of the gridlet hierarchy may facilitate efficient filtering process, since the set of child gridlets at higher LODs can be discounted if the parent gridlet does not satisfy the filter.

Having loaded the gridlets that match the filter, the geometry and properties may be fed to the rendering pipeline, which will then go onto further filter the data at a cell level, as at 708.

If the system is being used interactively, as determined at 710, then the number of gridlets that satisfy the filter and are actually loaded may be compared with the determined maximum number of elements that support interactive usage of the model in the system ($N_{ci}$), as at 712. If the system is idle, on the other hand, as determined at 714, then the number of gridlets that satisfy the filter and are actually loaded is compared with the maximum number of elements supported by the idle system ($N_{cm}$), as at 716. It will be appreciated that the determination at 714 may be separate from that of 710, or the determination at 714 may, more simply, be the negative of the determination at 710.

If there is additional capacity in the pipeline (e.g., if the system is idle), as determined at 718, then the LoD level is reduced by one, as at 720, and the process 700 may return to block 706. On the other hand, if there is no additional capacity, the gridlets at the LOD selected, and that satisfy the filter(s) may be transmitted or otherwise caused to be displayed as part of a rendering of a scene in a model, as at 722.

Frequently the visualization of property values animated through time may be employed and, having, rendered the property at the first time step, the process 700 may be repeated to render the property at the next time step. If solely a geometric filter is used and the view remains static then the selection of gridlets can be reused from one step to the next.

Embodiments of the method described above may ensure that the model is displayed at a resolution that the system can maintain a desirable level of performance. The interface may notify the user what LOD is being viewing, and may receive and implement input forcing a higher or lower LOD, e.g., at the user's discretion.

Furthermore, the extent of the model being visualized may be reduced, for example by zooming in on a particular area and hence pushing more of the model off-screen, or by applying a more restrictive geometric filter. An interactive bounding box that the user can stretch, rotate, etc. may be employed to add an additional constraint on a given filter, allowing users to quickly increase the resolution in a given area.

In addition, in less demanding scenarios in which the LOD 0 geometry is already present on the visualization workstation, the same filtering and loading pipeline may be utilized in two further embodiments. If sufficient bandwidth is available, the algorithm may be fixed to always search down to the LOD0 gridlets and retrieve the property data at the original simulation resolution.

The LOD may also be varied to maintain interactivity as in the above algorithm, but the recovered properties would be mapped back the lowest-level LOD0 geometry for rendering, i.e. multiple LOD0 gridlets/cells may be painted with the property retrieved from a higher LOD gridlet.

Figure 8:
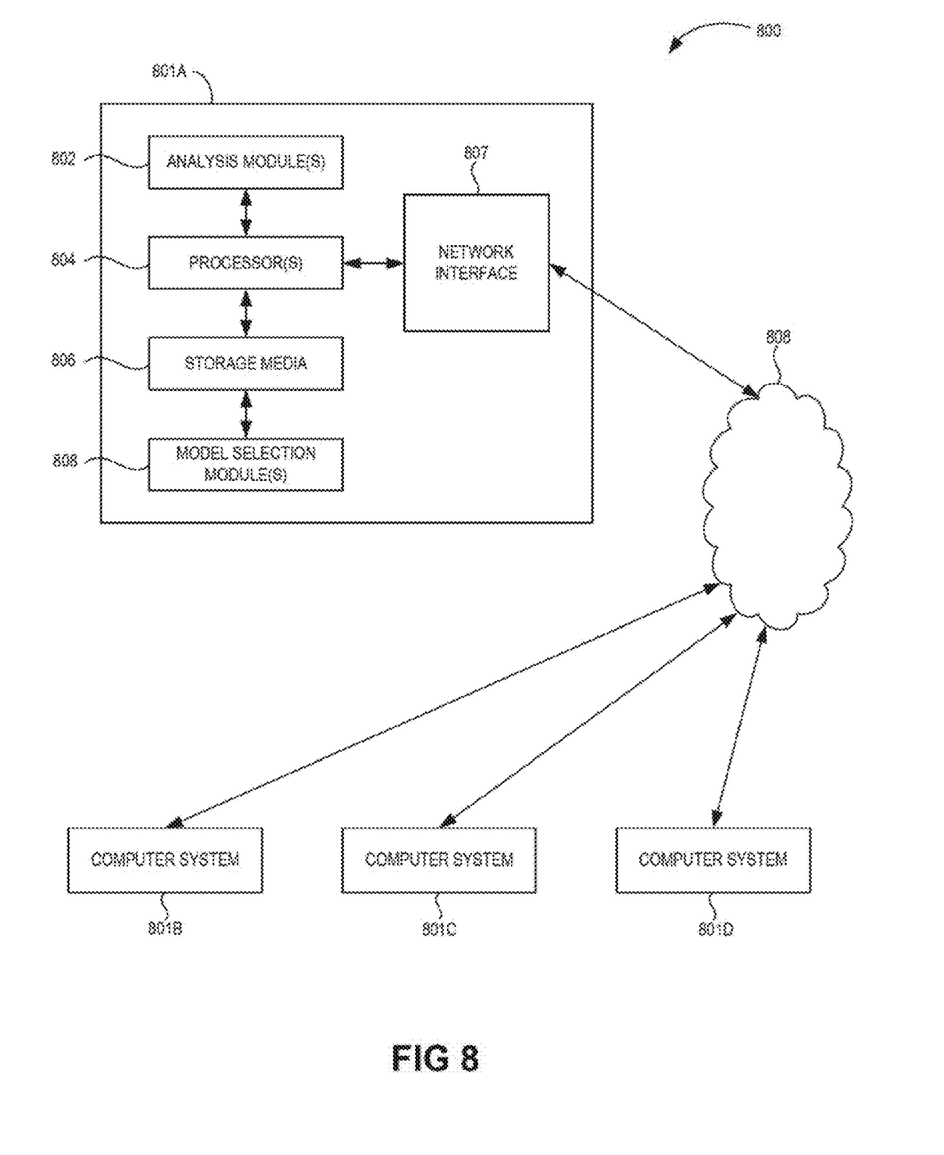
FIG. 8 illustrates a schematic view of a computing system, according to an embodiment.

In some embodiments, the method 100 (and/or any of the processes thereof) may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein e.g., methods 100-1200, and/or combinations and/or variations thereof). To perform these various tasks, the analysis module 802 executes independently, or in coordination with, one or more processors 804, which is or are) connected to one or more storage media 806A. The processor(s) 804 is (or are) also connected to a network interface 807 to allow the computer system 801A to communicate over a data network 808 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806A can be implemented as one or more computer-readable or machine-readable storage media. Note that while in the example embodiment of FIG. 8 storage media 806A is depicted as within computer system 801A, in some embodiments, storage media 806A may be distributed within and/or across multiple internal and/or external enclosures of computing system 801A and/or additional computing systems. Storage media 806A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running, the machine-readable instructions, or located at a remote site from which machine-readable instructions can be downloaded over a network for execution.

In some embodiments, computing system 800 contains one or more model selection module(s) 808. In the example of computing system 800, computer system 801A includes model selection module 808. In some embodiments, a single model selection module may be used to perform some or all aspects of one or more embodiments of the method 100. In alternate embodiments, a plurality of model selection modules may be used to perform some or all aspects of method 100.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The steps in the processing methods described herein may be implemented by running one or more functional modules in information processing apparatus such as general purpose processors or application specific chips, such as ASICs, FPGAs, PLDs, or other appropriate devices. These modules, combinations of they modules, and/or their combination with general hardware are all included within the scope of protection of the invention.

It is important to recognize that geologic interpretations, models and/or other interpretation aids may be refined in an iterative fashion; this concept is applicable to the method 100 as discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for providing a visualization of a model, comprising:
   receiving a grid of the model, the grid comprising a plurality of cells representing space, time, or both in the model;
   grouping at least some of the plurality of cells into first-level gridlets, wherein a number of cells in the model is greater than a number of first-level gridlets in the model;
   grouping at least some of the first-level gridlets into second-level gridlets, wherein the number of first-level gridlets is greater than a number of second-level gridlets in the model;
   determining a first upper limit of elements to send for display, based on a display system capability;
   determining that the number of first-level gridlets exceeds the first upper limit, and that the number of second-level gridlets is less than or equal to the first upper limit; and
   in response, selecting at least some of the second-level gridlets for display and omitting from display at least some of the plurality of cells and at least some of the first-level gridlets.

2. The method of claim 1, further comprising defining a hierarchy of nodes comprising first-level nodes and second-level nodes, wherein the first-level nodes are associated with the first-level gridlets, and the second-level nodes are associated with the second-level gridlets.

3. The method of claim 2, wherein grouping the plurality of cells into first-level gridlets comprises padding out one or more of the plurality of cells by inserting nodes having a zero or null value in the hierarchy.

4. The method of claim 1, wherein the first upper limit is associated with an interactivity of the model when displayed by the display system.

5. The method of claim 4, further comprising:
determining that the display system is idle; and
determining a second upper limit of elements to send for display, based on a capability of the display system when the system is idle with respect to displaying the model, wherein the second upper limit is greater than the first upper limit.

6. The method of claim 1, wherein grouping the plurality of cells into the first-level gridlets comprises grouping the plurality of cells based on proximity of the cells to one another in time, proximity of the cells to one another in space, one or more physical properties of the cells, or a combination thereof.

7. The method of claim 1, wherein grouping the plurality of cells into the first-level gridlets comprises avoiding a preferential dimension in the grouping.

8. The method of claim 1, further comprising:
determining respective first values in association with the respective first-level gridlets based on a combination of values associated with the respective cells grouped therein; and
determining respective second values in association with the respective second-level gridlets based on a combination of the respective first values associated with the respective first-level gridlets grouped therein.

9. The method of claim 1, further comprising:
defining a scene to display; and
determining the number of cells, the number of first-level gridlets, and the number of second-level gridlets based on the cells, first-level gridlets, and second-level gridlets contained in the scene, wherein selecting the second-level gridlets to display comprises selecting the second-level gridlets contained in the scene for display.

10. The method of claim 1, further comprising filtering the second-level gridlets based on a geometric characteristic, a physical characteristic, or both, prior to causing the at least some of the second-level gridlets to be displayed.

11. A non-transitory computer-readable medium storing instructions that, when executed by one or more processors of a computing system, cause the computing system to perform operations, the operations comprising:
receiving a grid of a model, the grid comprising a plurality of cells representing space, time, or both in the model;
grouping at least some of the plurality of cells into first-level gridlets, wherein a number of cells in the model is greater than a number of first-level gridlets in the model;
grouping at least some of the first-level gridlets into second-level gridlets, wherein the number of first-level gridlets is greater than a number of second-level gridlets in the model;
determining a first upper limit of elements to send for display, based on a display system capability;
determining that the number of first-level gridlets exceeds the first upper limit, and that the number of second-level addicts is less than or equal to the first upper limit; and
in response, selecting at least some of the second-level gridlets for display and omitting from display at least some of the plurality of cells and at least some of the first-level gridlets.

12. The medium of claim 11, wherein the operations further comprise defining a hierarchy of nodes comprising first-level nodes and second-level nodes, wherein the first-level nodes are associated with the first-level gridlets and the second-level nodes are associated with the second-level gridlets.

13. The medium of claim 12, wherein grouping the plurality of cells into first-level gridlets comprises padding out one or more of the plurality of cells by inserting nodes having a zero or null value in the hierarchy.

14. The medium of claim 11, wherein the first upper limit is associated with an interactivity of the model when displayed by the display system, and wherein the operations further comprise:
determining that the display system is idle; and
determining a second upper limit of elements to send for display, based on a capability of the display system when the system is idle with respect to displaying the model, wherein the second upper limit is greater than the first upper limit.

15. The medium of claim 11, wherein grouping the plurality of cells into the first-level gridlets comprises grouping the plurality of cells based on proximity of the cells to one another in time, proximity of the cells to one another in space, one or more physical properties of the cells, or a combination thereof.

16. The medium of claim 11, wherein the operations further comprise:
determining respective first values in association with the respective first-level gridlets based on a combination of values associated with the respective cells grouped therein; and
determining respective second values in association with the respective second-level gridlets based on a combination of the respective first values associated with the respective first-level gridlets grouped therein.

17. The medium of claim 11, wherein the operations further comprise:
defining a scene to display; and
determining the number of cells, the number of first-level gridlets, and the number of second-level gridlets based on the cells, first-level gridlets, and second-level gridlets contained in the scene, wherein selecting the second-level gridlets to display comprises selecting the second-level gridlets contained in the scene for display.

18. A computing system, comprising:
one or more processors; and
a memory system comprising one or more non-transitory computer-readable media storing instructions that, when executed by at least one of the one or more processors, cause the computing system to perform operations, the operations comprising:
receiving a grid of a model, the grid comprising a plurality of cells representing space, time, or both in the model;
grouping at least some of the plurality of cells into first-level gridlets, wherein a number of cells in the model is greater than a number of first-level gridlets in the model;
grouping at least some of the first-level gridlets into second-level gridlets, wherein the number of first-level gridlets is greater than a number of second-level gridlets in the model;

determining a first upper limit of elements to send for display, based on a display system capability;

determining that the number of first-level gridlets exceeds the first upper limit, and that the number of second-level gridlets is less than or equal to the first upper limit; and in response, selecting at least some of the second-level gridlets for display and omitting from display at least some of the plurality of cells and at least some of the first-level gridlets.

19. The system of claim 18, wherein the operations further comprise defining a hierarchy of nodes comprising first-level nodes and second-level nodes, wherein the first-level nodes are associated with the first-level gridlets, and the second-level nodes are associated with the second-level gridlets.

20. The system of claim 18, wherein the first upper limit is associated with an interactivity of the model when displayed by the display system, and wherein the operations further comprise;

determining that the display system is idle; and determining a second upper limit of elements to send for display, based on a capability of the display system when the system is idle with respect to displaying, the model, wherein the second upper limit is greater than the first upper limit.

* * * * *